United States Patent
De Fatis

(12) 
(10) Patent No.: US 6,251,316 B1
(45) Date of Patent: Jun. 26, 2001

(54) METHOD OF PRODUCING SOLID ARTICLES OF CLAY FOAM TO BE USED IN BUILDING

(76) Inventor: Stefano Tabarelli De Fatis, 29, Via Sopramuro - 29100, Piacenza (IT)

( * ) Notice: Subject to any disclaimer, the term of this patent is extended or adjusted under 35 U.S.C. 154(b) by 0 days.

(21) Appl. No.: 09/560,414

(22) Filed: Apr. 27, 2000

(30) Foreign Application Priority Data

Apr. 28, 1999 (IT) .............................................. RM99A0261

(51) Int. Cl.$^7$ ...................................................... B29C 65/00
(52) U.S. Cl. ............................ 264/42; 264/101; 264/621
(58) Field of Search ................................ 264/42, 621, 101

(56) References Cited

U.S. PATENT DOCUMENTS

| | | | | |
|---|---|---|---|---|
| 3,409,450 | * | 11/1968 | Weber | 264/42 |
| 3,673,290 | * | 6/1972 | Brubaker et al. | 264/43 |
| 5,151,228 | * | 9/1992 | Vahlbrauk | 264/42 |

* cited by examiner

*Primary Examiner*—Christopher A. Fiorilla
(74) *Attorney, Agent, or Firm*—DeLio & Peterson, LLC

(57) ABSTRACT

A method of producing foamed clay with optimum characteristics of porosity, mechanical resistance, high coefficients of reduced weight, and thermal and acoustic insulation, wherein a fluid mass consisting of clay is formed, into which compostions reacting therebetween are put so as to cause the homogenous foaming of the whole clay mass.

8 Claims, No Drawings

METHOD OF PRODUCING SOLID ARTICLES OF CLAY FOAM TO BE USED IN BUILDING

BACKGROUND OF THE INVENTION

1. Field of the Invention

The present invention relates to a method of producing solid articles of clay foam to be used in building and products obtained therefrom.

2. Description of Related Art

The need to lighten parts of buildings, such as main walls, curtain walls, partition walls and ceilings, and to give them the required insulating, deadening properties has brought to the manufacturing of hollow materials such as hollow clay tiles, hollow clay blocks, plaster board and the like that do not fully solve the problems.

Such parts of buildings may also be made of synthetic foam materials such as polystyrene, polyurethane, etc., combining light weight and good deadening, insulating properties. The problem of inflammability of such materials has been recently solved so that they can presently be used in building as panels, especially covering panels. However, the problem of their poor mechanical resistance to compressive stress has not been solved so far and their use as carrying structure is excluded.

In an attempt to foam materials inherently provided with mechanical strength, incombustibility, and easy mouldability such as clay, gases or substances developing gases have been put therein using raw clay as starting material.

However, such attempts have not provided satisfactory results so far both as far as the moulding of a homogeneously foamed mass and mouldability and mechanical strength thereof is concerned.

SUMMARY OF THE INVENTION

A method of providing a solid article of clay foam to be used in building, including the steps of:

a) providing baked clay which has been ground to form clay particles;

b) providing a water solution of a salt of silicic acid;

c) mixing the clay particles and the water solution to form a fluid mass;

d) dividing the fluid mass into a first portion and a second portion and placing each portion in a separate first and second container, respectively;

e) adding formaldehyde to the first portion in the first container in an amount of 5–15% by weight of the first portion and thoroughly stirring;

f) adding hydrogen peroxide to the second portion in the second container in an amount of about of 5–15% by weight of the second and thoroughly stirring;

g) sucking the fluid mass in the first and second containers into a sealed vacuum reactor and mixing thoroughly to form a reaction mixture wherein the silicic acid salt is caused to harden and gel thus forming a porous, solid mass; and h) transferring the porous, solid mass to a mold to dry, thus forming the desired clay foam solid article.

DESCRIPTION OF THE PREFERRED EMBODIMENT

The Applicant of the present invention dealt with such problem in a new fashion by using as starting material ground baked clay instead of raw clay mixed with a salt of silicic acids and particularly the sodium salt of silicic acids with the addition of additives capable of developing bubbles spread homogeneously in the mass of the materials so that a good foaming of the mass with consequent hardening and solidification thereof is accomplished.

The selected additives are hydrogen peroxide and formaldehyde, the latter being in a 10% to 50%, preferably 25%, water solution without methanol, hydrogen peroxide being 50 to 150 volumes, preferably 100 volumes.

However, as the mentioned additives are very irritating and their reaction is rather strong, the Applicant provided a method in which they are made to react only within a final sealed reactor.

According to the invention ground baked clay is mixed with sodium silicate in water solution in a ration of 50:50 by weight forming a rather fluid mass which is then divided into two equal masses located in first and second separated containers communicating with the above-mentioned final reactor.

The method according to the invention includes the following steps in details:

a) mixing intimately ground baked clay and the water solution of sodium silicate in a 50:50 weight ratio;

b) dividing the liquid mass obtained from step a) into two portions with the same weight and putting them into first and second containers;

c) adding formaldehyde to the mass of ground baked clay-sodium silicate from the first container in an amount of 5 to 15% by weight, preferably 10%, and stirring strongly;

d) adding 100 volumes hydrogen peroxide to the mass of ground baked clay-sodium silicate from the second container in an amount of 5 to 15% by weight, preferably 10%, and stirring strongly;

e) sucking the two masses contained in the first and second containers into a sealed vacuum reactor, and stirring immediately.

The reaction between formaldehyde and hydrogen peroxide takes place in the reactor within the obtained mixed mass with development of molecular oxygen, formic acid, and carbonic acid. Accordingly, a neutralization of $Na_2O$ is accomplished and sodium silicate is caused to harden and gel so as to bind the mass with the result of having a porous, solid, mechanically resisting mass. The obtained mass will then be formed, as known, in the desired articles that will also have an inherently porous, solid, mechanically resisting, insulating, deadening structure.

Anionic or non-ionic surface-active agents can also be added to the mass either in the first or second container in the amount of 0.1 to 10% by weight, preferably 1%, to promote the formation of cells.

Finally, in order to improve the water tightness of the final product polysiloxanes are added in the amount of 0.1 to 10%, preferably 2%, also in this case to the second or first container to make the articles water proof.

The obtained solid, porous mass is then caused to dry in moulds to provide the final products.

Finally, in order to improve the water tightness of the final product polysiloxanes are added in an amount of 0.1 to 10%, preferably 2%, also in this case to the second or first container to make the articles water-proof.

The obtained solid, porous mass is then caused to dry in moulds to provide the final products.

What is claimed is:

1. A method of providing a solid article of clay foam to be used in building, including the steps of:

a) providing baked clay which has been ground to form clay particles;
b) providing a water solution of a salt of silicic acid;
c) mixing the clay particles and the water solution to form a fluid mass;
d) dividing the fluid mass into a first portion and a second portion and placing each portion in a separate first and second container, respectively;
e) adding formaldehyde to the first portion in the first container in an amount of 5–15% by weight of the first portion and thoroughly stirring;
f) adding hydrogen peroxide to the second portion in the second container in an amount of about of 5–15% by weight of the second portion and thoroughly stirring;
g) sucking the fluid mass in the first and second containers into a sealed vacuum reactor and mixing thoroughly to form a reaction mixture wherein the silicic acid salt is caused to harden and gel thus forming a porous, solid mass; and
h) transferring the porous, solid mass to a mold to dry, thus forming the desired clay foam solid article.

2. The method of claim 1 wherein the water solution of a silicic salt is sodium silicate.

3. The method of claim 1 wherein the clay particles and the silicic acid water solution are mixed in a 50:50 weight ratio.

4. The method of claim 1 wherein the formaldehyde is added in an amount of 10% by weight using a 10–50% weight water solution of formaldehyde.

5. The method of claim 1 wherein the hydrogen peroxide is added in an amount of 10% by weight.

6. The method of claim 1 wherein an anionic surface-active agent is added to the fluid mass in one of the first or second containers in an amount of 0.1–10% by weight.

7. The method of claim 1 wherein a non-ionic surface-active agent is added to the fluid mass in one of the first or second containers in an amount of 0.1–10% by weight.

8. The method of claim 1 wherein a polysiloxane is added to the fluid mass in one of the first or second containers in an amount of about 0.1–10% by weight.

* * * * *

UNITED STATES PATENT AND TRADEMARK OFFICE
CERTIFICATE OF CORRECTION

PATENT NO.    : 6,251,316 B1
DATED         : June 26, 2001
INVENTOR(S)   : Stefano Tabarelli De Fatis It is certified that error appears in the above-identified patent and that said Letters Patent is hereby corrected as shown below:

Column 1,
Line 53, after "of about" delete "of".
Line 66, after "such" insert -- a --.

Column 2,
Line 16, delete "ration" and substitute therefor -- ratio --.
Line 59 - 64, please delete delete the following duplicate paragraphs:
  "Finally, in order to improve the water tightness
of the final product polysiloxanes are added in an
amount of 0.1 to 10%, preferably 2%, also in this case
to the second or first container to make the articles
water-proof.
  The obtained solid, porous mass is then caused to dry
in moulds to provide the final products."

Signed and Sealed this

Twelfth Day of February, 2002

*Attest:*

JAMES E. ROGAN
*Attesting Officer*   *Director of the United States Patent and Trademark Office*